US011159197B2

(12) United States Patent
Weissman et al.

(10) Patent No.: US 11,159,197 B2
(45) Date of Patent: Oct. 26, 2021

(54) SELF-INTERFERENCE CANCELLATION FOR IN-BAND FULL-DUPLEX WIRELESS COMMUNICATION

(71) Applicant: QUALCOMM Incorporated, San Diego, CA (US)

(72) Inventors: Haim Mendel Weissman, Haifa (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 16/397,517

(22) Filed: Apr. 29, 2019

(65) Prior Publication Data
US 2020/0343934 A1    Oct. 29, 2020

(51) Int. Cl.
*H04B 1/525* (2015.01)
*H04B 15/02* (2006.01)
*H04L 5/14* (2006.01)

(52) U.S. Cl.
CPC ......... *H04B 1/525* (2013.01); *H04B 15/02* (2013.01); *H04L 5/1461* (2013.01)

(58) Field of Classification Search
CPC ....... H04B 1/525; H04B 1/10; H04B 1/0475; H04B 1/1027; H04B 1/1036; H04B 2001/1045; H04B 15/00; H04B 1/109; H04B 15/02; H04B 1/40; H04B 1/56; H04B 7/15585; H04B 17/345; H04B 1/7107; H04B 1/005; H04B 1/0075; H04B 1/71; H04B 3/32; H04B 3/234; H04B 1/30; H04B 1/0039; H04B 1/0092; H04B 1/28; H04B 1/44; H04B 1/52; H04B 17/0085;

(Continued)

(56) References Cited

U.S. PATENT DOCUMENTS 5,046,133 A * 9/1991 Watanabe ............. H04B 1/126
                                                    455/138
6,539,204 B1 * 3/2003 Marsh ..................... H04B 1/123
                                                    455/296

(Continued)

FOREIGN PATENT DOCUMENTS

EP              2471185 A1 *  7/2012  ............. H04B 1/525

OTHER PUBLICATIONS

M. Sim, M. Chung, D. Kim, J. Chung, D. Kim, C.-B. Chae, "Nonlinear Self-interference Cancellation for Full-duplex Radios: From Link-level and System-level Performance Perspectives", Jun. 23, 2017, IEEE Communications Magazine, vol. 55, pp. 158-167. (Year: 2017).*

(Continued)

*Primary Examiner* — Lana N Le
(74) *Attorney, Agent, or Firm* — Qualcomm Incorporated

(57) ABSTRACT

An in-band full-duplex transceiver includes a self-interference mixer for up-converting an adjusted digital baseband signal into an up-converted self-interference cancellation signal. The adjusted digital baseband signal has a phase opposite to a phase for a leakage signal from a leakage path for the transceiver. Similarly, the adjusted digital baseband signal has a magnitude matching a magnitude for the leakage signal. Given this phasing and magnitude for the up-converted self-interference signal, it substantially cancels the leakage signal when added with a received signal contaminated by the leakage signal.

20 Claims, 6 Drawing Sheets

(58) Field of Classification Search
CPC ........ H04B 17/21; H04B 1/00; H04B 1/0007;
H04B 1/0028; H04B 1/0458; H04B
1/123; H04B 1/126; H04B 1/18; H04B
1/26; H04B 1/403; H04B 1/66; H04B
3/542; H04B 5/0062; H04B 7/005; H04B
7/0617; H04B 7/068; H04B 7/12; H04B
1/0032; H04B 1/302; H04B 1/68; H04B
2201/70701; H04B 7/155; H04B 3/23;
H04L 5/0055; H04L 5/14; H04L 5/0005;
H04W 72/082
USPC .......... 455/63.1, 114.2, 278.1, 296; 375/144,
375/148, 346
See application file for complete search history.

(56) References Cited

U.S. PATENT DOCUMENTS

| | | | |
|---|---|---|---|
| 7,876,867 B2* | 1/2011 | Filipovic | H04B 1/525 375/346 |
| 8,055,235 B1* | 11/2011 | Gupta | H04B 1/525 455/296 |
| 9,100,099 B2 | 8/2015 | Loh et al. | |
| 9,413,516 B2 | 8/2016 | Khandani et al. | |
| 9,571,205 B1* | 2/2017 | Suarez | H04B 1/525 |
| 9,882,685 B2* | 1/2018 | Feygin | H04L 1/20 |
| 9,887,862 B2 | 2/2018 | Zhou et al. | |
| 10,050,663 B1 | 8/2018 | Ku et al. | |
| 2009/0143033 A1* | 6/2009 | Mirzaei | H04B 1/0458 455/127.2 |
| 2011/0051833 A1* | 3/2011 | Midya | H04B 1/525 375/267 |
| 2013/0003792 A1* | 1/2013 | Hu | H04B 3/542 375/219 |
| 2014/0273906 A1* | 9/2014 | Feygin | H04L 1/20 455/296 |
| 2014/0348032 A1* | 11/2014 | Hua | H04L 5/1461 370/277 |
| 2015/0333847 A1* | 11/2015 | Bharadia | H04L 5/1461 455/63.1 |
| 2016/0269061 A1* | 9/2016 | Hwang | H04B 1/525 |
| 2016/0344432 A1* | 11/2016 | Hwang | H04B 1/525 |
| 2016/0380653 A1* | 12/2016 | Sheikh | H04B 1/12 370/282 |
| 2016/0380669 A1* | 12/2016 | Liu | H04L 27/34 375/219 |
| 2017/0104506 A1* | 4/2017 | Liu | H04L 27/26 |
| 2018/0287559 A1* | 10/2018 | Zhu | H04B 15/02 |
| 2018/0309475 A1 | 10/2018 | Kim et al. | |
| 2020/0091608 A1* | 3/2020 | Alpman | H04B 1/30 |

OTHER PUBLICATIONS

Y. Li, "Self-Interference Cancellation in Full-Duplex Radio.", 2017, ProQuest Dissertations and Theses Professional (1914677044), order No. 10260240, https://dialog.proquest.com/professional/docview/1914677044?accountid=131444 (Year: 2017).*

* cited by examiner

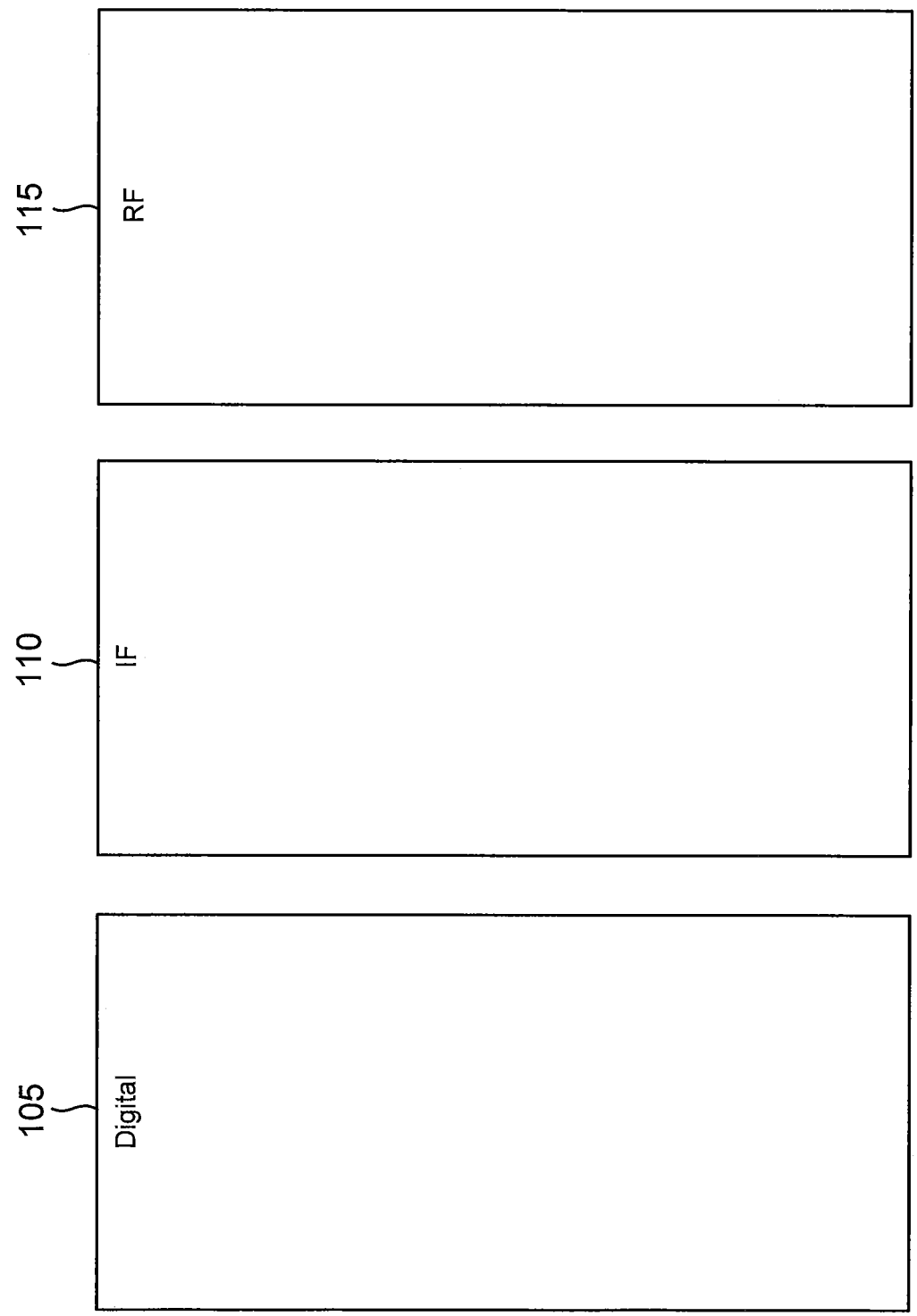

SELF-INTERFERENCE CANCELLATION FOR IN-BAND FULL-DUPLEX WIRELESS COMMUNICATION

TECHNICAL FIELD

This application relates to in-band full-duplex wireless communication and more particularly to self-interference cancellation for in-band full-duplex wireless communication.

BACKGROUND

Since the wireless spectrum is not unlimited, users must limit their transmissions to regulated bandwidths. This bandwidth regulation also limits the achievable data rates because data rates are generally proportional to bandwidth as governed by Shannon's law. Despite these bandwidth limitations, modern communication standards are demanding ever greater data rates. For example, the fifth generation (5G) wireless standard provides for data rates of up to 20 gigabits per second. To achieve such high data rates requires network users to efficiently use their available bandwidth. One way to enhance bandwidth usage is an in-band full-duplex operation in which a transceiver transmits and receives data simultaneously over the same frequency band. But such in-band full-duplex operation raises significant issues of self-interference. A cellular handset can only separate its transmitting and receiving antennas by a relatively short distance, so the transmitted signal may couple strongly into the received signal.

The self-interference for the received signal is inversely proportional to the separation in the operating wavelength between the transmitting and receiving antennas. In older communications standards such as 3G, the licensed frequency bands were relatively lower in frequency such that the separation in wavelengths is relatively small. But the licensed bands in the 5G standard include markedly higher frequencies such that the antenna separation as measured by wavelengths is more pronounced. In addition, the antennas themselves are more compact for such higher frequencies such that a cellular handset can employ a transmitting array of antennas as well as a receiving array of antennas. This use of antennas arrays enables the handset (user equipment) to employ beamforming techniques that further limit the self-interference problem. The increased attenuation between the transmitting and receiving antennas and additional suppression through beamforming combined with analog and digital self-interference cancellation techniques makes the bandwidth efficiency of in-band full-duplex operation an attractive option for 5G systems. But the implementation of in-band full-duplex operation remains very challenging since it requires the handset to have approximately 110 dB of isolation between the receiving and transmitting signal paths. As the isolation worsens, the self-leakage causes receiver desense that overwhelms the received signal.

To counter the leakage between transmit and receive signals, various self-interference cancellation techniques have been proposed but have been ineffective for a number of reasons. For example, digital self-cancellation is only effective if the desired signal falls within the analog-to-digital converter (ADC) dynamic range, i.e., being above the ADC noise floor. Although 5G operation mitigates the isolation limitation between the transmitting and receiving antennas, a user equipment (UE) receiver having a robust isolation of 50 dB will still be desensed by 3 dB. This desense may be worsened to 10 dB if the isolation is reduced to 40 dB such as by reflections from a user's hand or imperfect positioning of the transmitting and receiving antennas.

There is thus a need in the art for an in-band full-duplex architecture with self-interference cancellation having virtually no desense issues.

SUMMARY

To enable in-band full-duplex operation with robust cancellation of a leakage signal having a leakage phase and a leakage magnitude, a transceiver is provided that generates an adjusted digital baseband signal having a magnitude adjusted responsive to the leakage magnitude and having a phase adjusted responsive to the leakage phase. An analog-to-digital conversion and up-conversion of the adjusted digital baseband signal forms an up-converted analog self-interference cancellation signal that has a matching magnitude to the leakage magnitude and a phase that is 180 degrees out of phase with the leakage phase. By adding the up-converted analog self-interference cancellation signal with a received signal that is contaminated with the leakage signal, the transceiver forms a self-interference-cancelled received signal in which the leakage signal is substantially cancelled.

These and other advantageous features may be better appreciated through the following detailed description.

BRIEF DESCRIPTION OF THE DRAWINGS

FIG. 1A is a high-level illustration of a transceiver architecture in accordance with an aspect of the disclosure.

Implementations of the present disclosure and their advantages are best understood by referring to the detailed description that follows. It should be appreciated that like reference numerals are used to identify like elements illustrated in one or more of the figures.

DETAILED DESCRIPTION

Figure 1B:
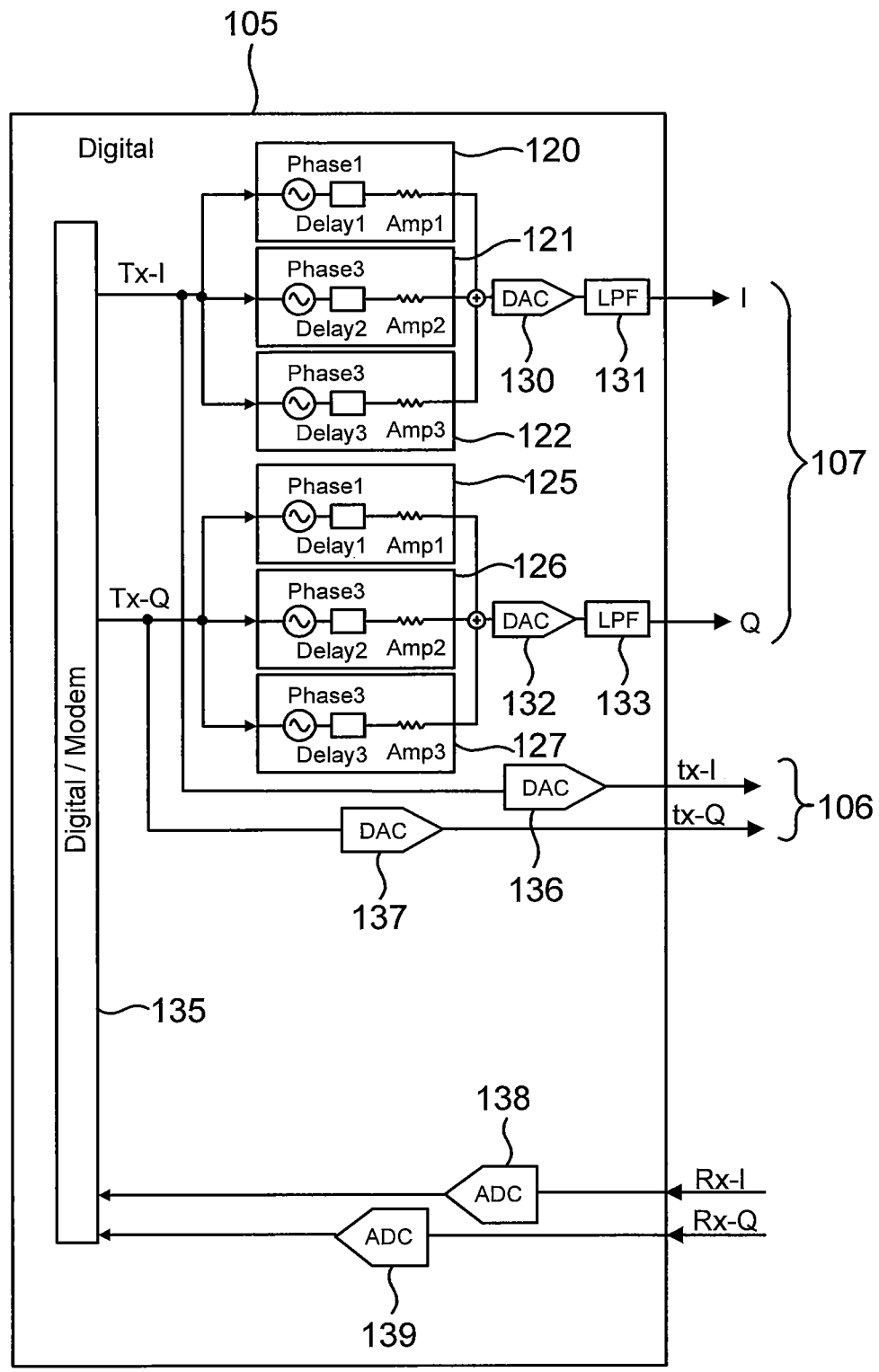
FIG. 1B illustrates a first embodiment of the baseband section for the transceiver of FIG. 1A.

A self-interference cancellation architecture is provided for an in-band full-duplex transceiver. The following self-interference cancellation architecture is based upon the superheterodyne double conversion that is proposed for 5G millimeter wave systems such that the transmitter baseband signal is first converted to an intermediate frequency (IF) and then converted from IF to RF. However, it will be appreciated that an analogous self-interference cancellation technique may be implemented in direct-conversion architectures.

To better appreciate the solution to self-interference disclosed herein, note that there are several leakage paths over which energy from the transmitter leaks into the received signal. For example, there is an on-chip direct leakage path. An example of such on-chip leakage would be from the output of the power amplifiers in the transmitter to the input of the low-noise amplifiers in the receiver. In addition, there is an over-the-air direct leakage path from the transmitting antennas to the receiving antennas. Finally, there is an indirect leakage path caused by nearby scatterers that reflect the transmitted signal back to the transceiver (e.g., one's hands, etc.) Each of these leakage paths has its own delay, phase, and magnitude.

To address these various leakage paths, the I and Q digital channels for the transmission of a baseband signal are bifurcated into a transmitter path and an interference-cancellation ("mini") transmitter path. The transmitter path is a conventional transmitter path in which the digital baseband I and Q signals are converted to analog form and combined and up-converted into an IF signal that is then further up-converted to RF. The same digital baseband I and Q signals are delayed, phased, and adjusted for magnitude in the mini-transmitter path to account for the delay, phase, and magnitude characteristics of the leakage paths discussed above. Depending upon what leakage paths must be addressed, there may thus be a first processing of the digital I and Q signals to account for the on-chip direct leakage to form first adjusted digital baseband I and Q signals, a second processing of the digital baseband I and Q signals to account for the OTA direct leakage to form second adjusted digital baseband I and Q signals, and a third processing of the digital baseband I and Q signals to account for the indirect leakage to form third adjusted digital baseband I and Q signals. The resulting adjusted digital baseband I signals are combined and converted into an analog self-interference cancellation I signal that is upconverted to IF to form an up-converted analog self-interference cancellation in-phase signal (I). Similarly, the adjusted digital baseband Q signals are combined and converted into an analog self-interference cancellation quadrature-phase signal that is up-converted to IF to form an up-converted analog self-interference cancellation quadrature-phase signal (Q). A combination of the up-converted analog self-interference cancellation I and Q signals forms an up-converted analog self-interference cancellation signal as an output of the mini-transmitter path. But the up-converted analog self-interference cancelling signal is not additionally up-converted to RF to drive the transmitting antennas as is performed in the transmitter path.

Rather than being up-converted to RF, the up-converted analog self-interference cancellation signal is instead combined with an IF received signal that is contaminated by one or more leakage signals. The processing of the I and Q digital baseband signal causes the up-converted analog self-interference cancellation signal to match the leakage magnitudes for the leakage signals and to have phases that are 180 degrees out of phase with leakage phases for the leakage signals. The addition of the up-converted analog self-interference cancellation signal with the IF received signal thus substantially cancels the leakage signals from a resulting self-interference-cancelled IF signal.

The IF received signal results from the down-conversion of a received signal from the receiving antennas. After the IF received signal is combined with the up-converted analog self-interference cancelling signal to form the self-interference-cancelled IF signal, the self-interference-cancelled IF signal is down-converted into I and Q digital baseband received signals. The I and Q digital baseband received signals may then be processed by a digital core as would be performed in a conventional system. Some example embodiments will now be discussed in more detail.

A high-level illustration of an example transceiver 100 is shown in FIG. 1A. The baseband signals are formed and received in a baseband section 105. The up-conversion from baseband to IF as well as the down-conversion from IF to baseband occurs in an IF section 110. Finally, the up-conversion from IF to RF and the down-conversion from RF to IF occurs in an RF section 115.

Baseband section 105 is shown in more detail in an example embodiment in FIG. 1B. A digital core (and modem) 135 sources a digital baseband in-phase signal (Tx-I) and a digital baseband quadrature-phase signal (Tx-Q) for transmission. For a transmission path 106, a digital-to-analog converter (DAC) 136 converts the digital baseband in-phase signal into an analog in-phase baseband signal (tx-I) that is driven to IF section 110. Similarly, a DAC 137 converts the digital baseband quadrature-phase signal into an analog quadrature-phase baseband signal (tx-Q) that is also driven to IF section 110 to complete transmission path 106. Baseband section 105 also includes an analog-to-digital converter (ADC) 138 for converting an analog baseband in-phase received signal (Rx-I) from IF section 110 into a digital baseband in-phase received signal for processing by digital core 135. Similarly, an ADC 139 converts an analog baseband quadrature-phase received signal (Rx-Q) from IF section 110 into a digital baseband quadrature-phase received signal for processing by digital core 135.

A mini-transmitter path 107 in baseband section 105 has a plurality of self-interference correction circuits for adjusting the delay, phase, and magnitude of the digital baseband in-phase and quadrature-phase signals. The number of self-interference correction circuits depends upon the sources of self-interference that are to be cancelled. For example, a first self-interference correction circuit 120 addresses the in-phase self-interference from an on-chip direct leakage path between the transmitted and received signals in RF section 115. A second self-interference correction circuit 121 addresses the in-phase self-interference from the over-the-air leakage path between the transmitting and receiving antennas in RF section 115 (discussed further herein). Finally, a third self-interference correction circuit 122 addresses the in-phase self-interference from nearby scatterers to RF section 115. It will be appreciated that these sources of self-interference are merely representative of the variety of self-interference sources that may be corrected as disclosed herein. For example, mini-transmitter path 107 may include additional self-interference correction circuit(s) for addressing additional in-direct (or direct) sources of self-interference.

Regardless of the number of self-interference sources (leakage signals) that are being addressed, each self-interference correction circuit may adjust at least one of a delay, a phase, and a magnitude. In baseband section 105, all three parameters are adjusted but it will be appreciated that in some cases only two or just one of the three parameters may need adjusting to address the corresponding source of self-interference. As disclosed herein, this adjustment is performed in the digital domain, but it will be appreciated that that these factors may instead be corrected in the analog domain. Although the correction is performed in the digital domain, each self-interference correction circuit 120, 121, and 122 is shown for conceptual purposes as including a variable phase-shifter for providing the appropriate phase shift, a variable delay circuit for providing the appropriate delay, and a variable resistor (attenuator) for providing the appropriate magnitude decrease.

Each self-interference correction circuit is tuned according to its self-interference (leaking) source. For example, a self-interference correction circuit may lower the magnitude of the baseband signal to match the leakage magnitude of the corresponding self-interference source. In addition, a self-interference correction circuit may phase shift the baseband signal to be in anti-phase (180 degrees out of phase) with the leakage phase for the leakage signal in the corresponding leaking path. Similarly, a self-interference correction circuit may delay the baseband signal such as in response to a cross-correlation of the received signal in RF section 115 with its transmitted signal. The control of the phase-shifting, delay, and attenuation may be performed using a look-up table (LUT) (not illustrated) responsive to each leaking path.

The quadrature-phase baseband signal is similarly adjusted in corresponding self-interference correction circuits to adjust at least one of a variable phase, a variable delay, and a variable attenuation. The quadrature portion of mini-transmitter path 107 thus includes a first self-interference correction circuit 125 that addresses the quadrature-phase self-interference from the on-chip direct leakage between the transmitted and received signals in RF section 115. A second self-interference correction circuit 126 addresses the quadrature-phase self-interference from the over-the-air leakage between the transmitting and receiving antennas in RF section 115. Finally, a third self-interference correction circuit 127 addresses the quadrature-phase self-interference from nearby scatterers to RF section 115. Self-interference correction circuits 120, 121, and 121 comprise a plurality of in-phase self-interference correction circuits whereas self-interference correction circuits 125, 126, and 127 comprise a plurality of quadrature-phase self-interference correction circuits.

The outputs from the in-phase self-interference correction circuits 120, 121, and 122 are summed to form an adjusted digital baseband in-phase signal that is converted into analog form by an in-phase DAC 130. Similarly, the outputs from the quadrature-phase self-interference correction circuits 125, 126, and 127 are summed to form an adjusted digital baseband quadrature-phase signal that is converted into analog form by a quadrature-phase DAC 132. The resolution of DACs 130 and 132 in mini-transmitter path 107 may be less than the resolution of DACs 136 and 137 in transmitter path 106. For example, a six-bit resolution for DACs 130 and 132 provides 30 dB of self-interference cancellation. The analog output from in-phase DAC 130 may be filtered such as by a low-pass filter (LPF) 131 to form an analog self-interference cancellation in-phase signal (I signal). Similarly, an LPF 133 filters the analog output from quadrature-phase DAC 132 to form an analog self-interference cancellation in-phase signal (Q signal).

Figure 1C:
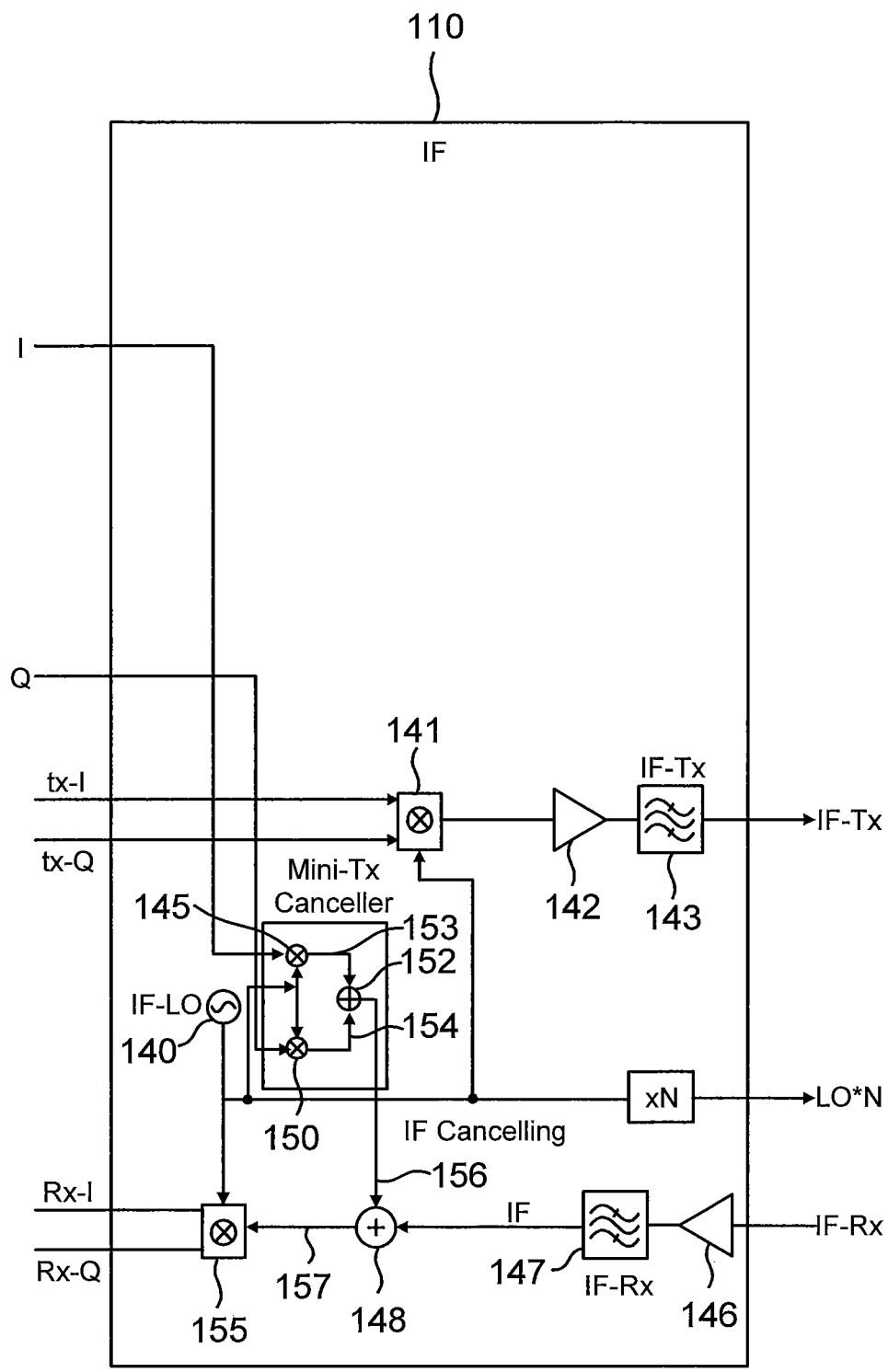
FIG. 1C illustrates an IF section for the transceiver of FIG. 1A.

IF section 110 is shown in more detail in FIG. 1C. A received IF signal (IF-Rx) from RF section 115 is amplified in an amplifier 146 and filtered in a filter 147 to form an uncorrected IF signal (IF). To substantially cancel the self-interference (SI) in the uncorrected IF signal, IF section 110 includes an in-phase self-interference cancellation mixer 145 and a quadrature-phase self-interference cancellation mixer 150. A clock source 140 generates a local oscillator clock signal (IF-LO) that is mixed in in-phase self-interference mixer 145 with the analog self-interference cancellation I signal to form an up-converted analog self-interference cancellation I signal 153. Similarly, a quadrature-phase self-interference mixer 150 upconverts the analog self-interference cancellation Q signal into an up-converted analog self-interference cancellation Q signal 154 responsive to a quadrature version (not illustrated for drawing clarity) of the local oscillator clock signal. An adder 152 adds up-converted analog self-interference cancellation I signal 153 and up-converted analog self-interference cancellation Q signal 154 to form an analog up-converted self-interference cancellation signal 156 that is added with the uncorrected IF signal in a self-interference cancellation adder 148 to form a self-interference-cancelled signal 157. IF section 110 thus advantageously substantially eliminates the leakage signals from self-interference-cancelled signal 157. The collection of SI cancellation mixers 145 and 150 as well as adder 152 may be denoted as a mini-transmitter SI canceller. A mixer 155 may then mix the SI-cancelled IF signal with the local oscillator clock signal (and its quadrature) to down-convert the SI-cancelled signal into the Rx-I and Rx-Q analog baseband signals.

The transmit path signals tx-I and tx-Q signals from baseband section 105 are up-converted to IF in a mixer 141 responsive to the local oscillator clock signal (and its quadrature) to form an IF-Tx signal that is amplified in an amplifier 142 and filtered in a filter 143 before the resulting IF-Tx signal is provided to RF section 115. The local oscillator clock signal is also multiplied N times in a multiplier (xN) to form an RF clock signal (LO*N) for RF section 115.

Figure 1D:
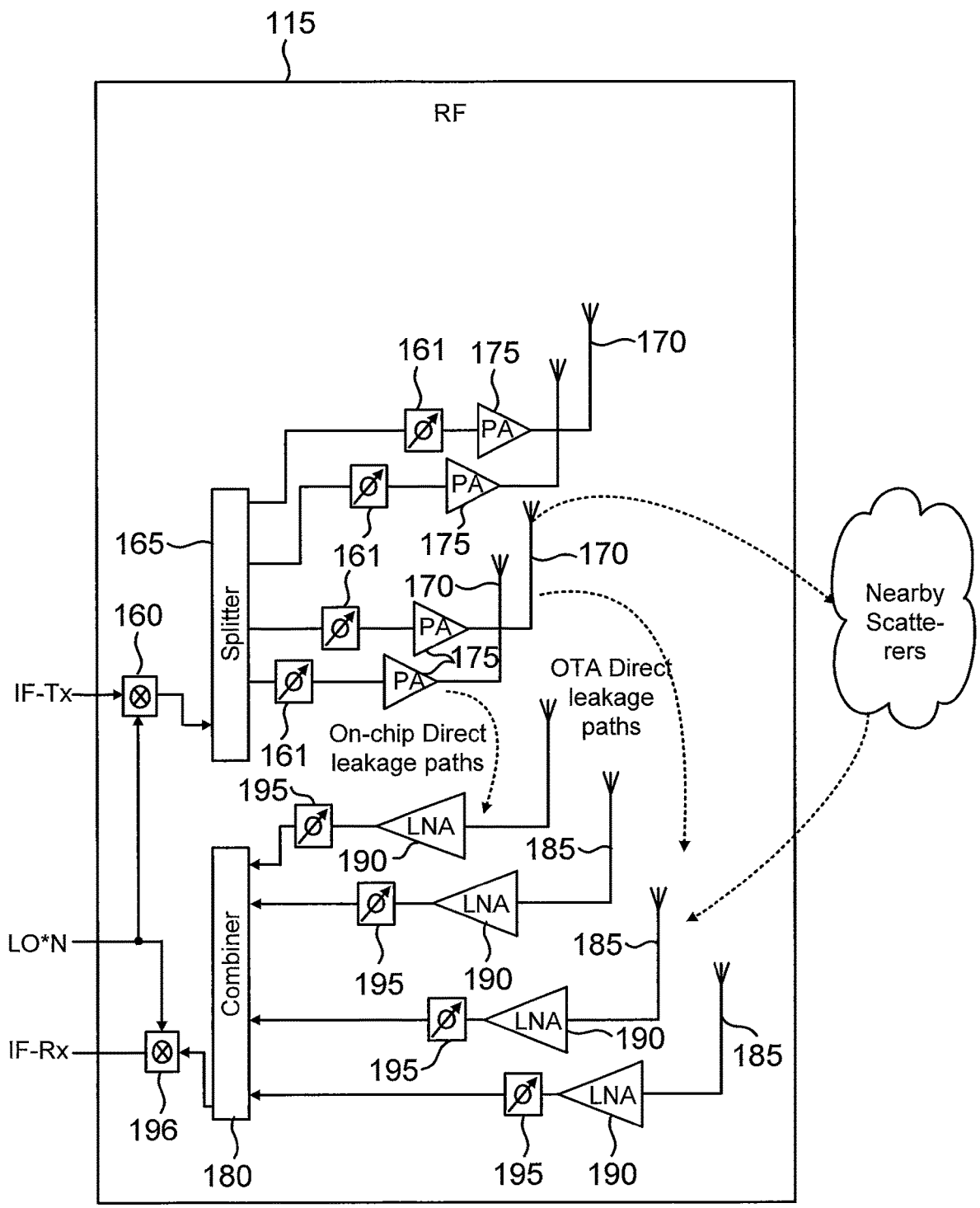
FIG. 1D illustrates an RF section for the transceiver of FIG. 1A.

RF section 115 is shown in more detail in FIG. 1D. The IF-Tx signal from IF section 110 is up-converted to RF in a mixer 160 responsive to the RF clock signal LO*N to form an RF signal. A splitter 165 splits the RF signal for distribution to an array of antennas 170. The RF signal to each antenna 170 may be phase-shifted in a corresponding phase-shifter 161 for beam-forming and beam-steering purposes before being amplified by a corresponding power amplifier 175.

The receive path in RF section 115 is analogous and includes an array of receiving antennas 185. The RF signal from each receiving antenna 185 may then be amplified in a corresponding low-noise amplifier (LNA) 190 and phased in a corresponding phase-shifter 195 before being combined in a combiner 180 to form a received radio-frequency signal. A radio-frequency mixer 196 down-converts the received radio-frequency signal responsive to the RF clock signal LO*N to form the received intermediate-frequency signal IF-Rx.

Some example SI leakage paths are illustrated in RF section 115. For example, an indirect SI leakage path extends from transmitting antennas 170 to nearby scatterers and back to receiving antennas 185. Self-interference correction circuits 122 and 127 discussed with regard to baseband section 105 address this indirect SI leakage from the nearby scatterers. A direct leakage path exists between transmitting antennas 170 and receiving antennas 185 that is addressed by self-interference correction circuits 121 and 126. Finally, there is an on-chip direct leakage path that is addressed by self-interference correction circuits 120 and 125. As discussed earlier, additional self-interference leakage paths such as an indirect or a direct leakage path may be addressed by the self-interference correction circuits and techniques discussed herein.

Figure 2:
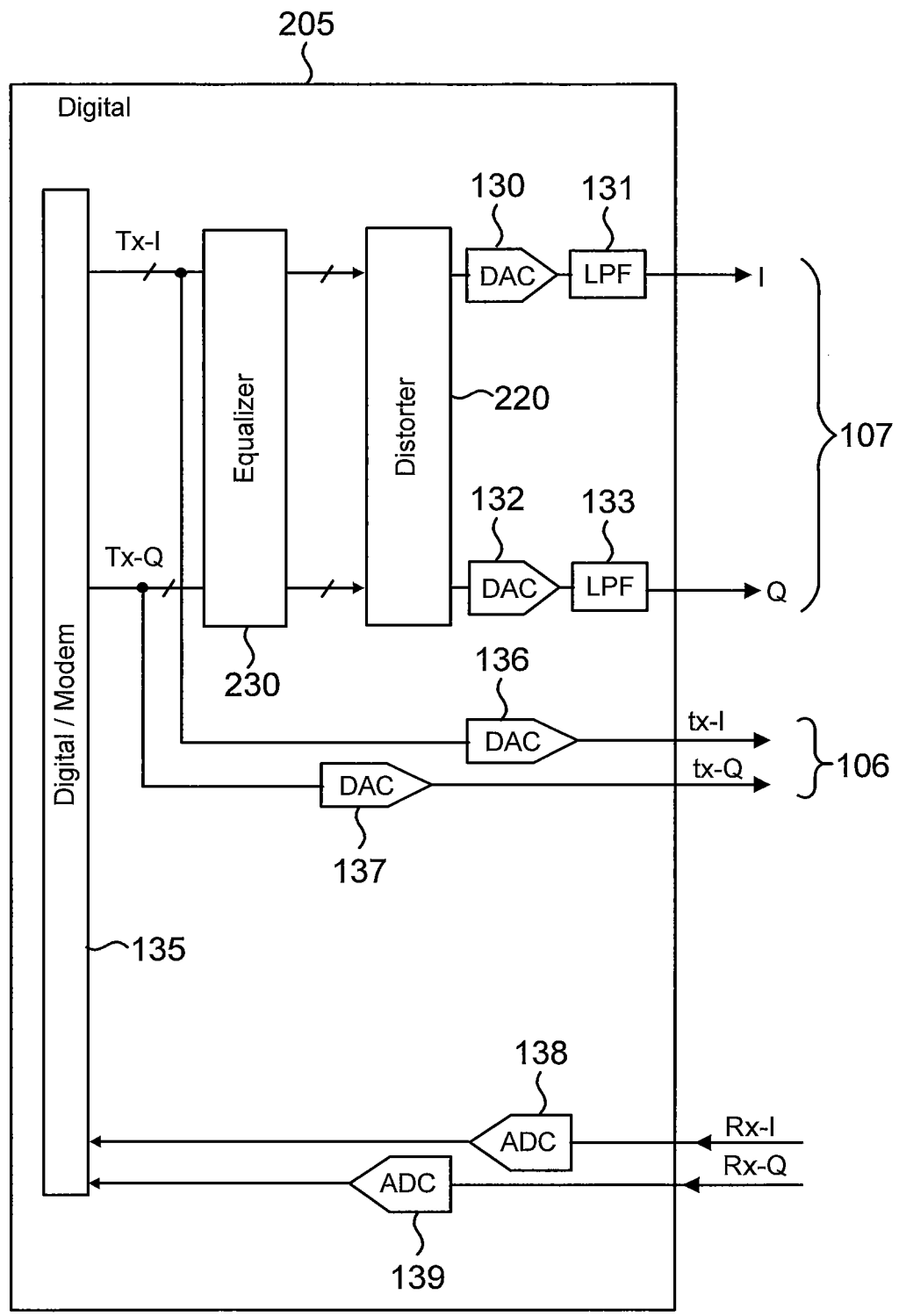
FIG. 2 illustrates a second embodiment of the baseband section for the transceiver of FIG. 1A.

Mini-transmitter path 107 in alternative embodiments of baseband section 105 may be implemented such as shown in FIG. 2 for an example baseband section 205. Conventional transmitter path 106 includes DACs 136 and 137 as discussed previously to digitize the I and Q digital baseband signals from digital core 135. Similarly, ADCs 138 and 139 digitize the Rx-I and Rx-Q signals to provide corresponding received digital baseband signals to the digital core. But the self-interference correction circuits for mini-transmitter path 107 are implemented by an equalizer 230. Equalizer 230 varies the phase, delay, and magnitude as appropriate for the addressed SI leakage paths to form the adjusted digital baseband in-phase and quadrature-phase signals that are digitized by corresponding DACs 130 and 132. DACs 130 and 132 as well as LPFs 131 and 133 function as discussed with regard to baseband section 105 to form the analog self-interference cancellation I and Q signals. To address non-linearities introduced by the amplification in the transmit and receive paths, the adjusted digital baseband in-phase and quadrature-phase baseband signals may be distorted to track the self-interference in a digital distortion circuit 220 after the processing in equalizer 230.

In one embodiment, the self-interference correction circuits of baseband section 105 or the equalizer of baseband section 205 may be deemed to form a means for adjusting a phase and an magnitude of a digital baseband signal to form an adjusted digital baseband signal responsive to the leakage phase and to the leakage magnitude of a leakage signal from a leakage path in the in-band full-duplex transceiver.

Figure 3:
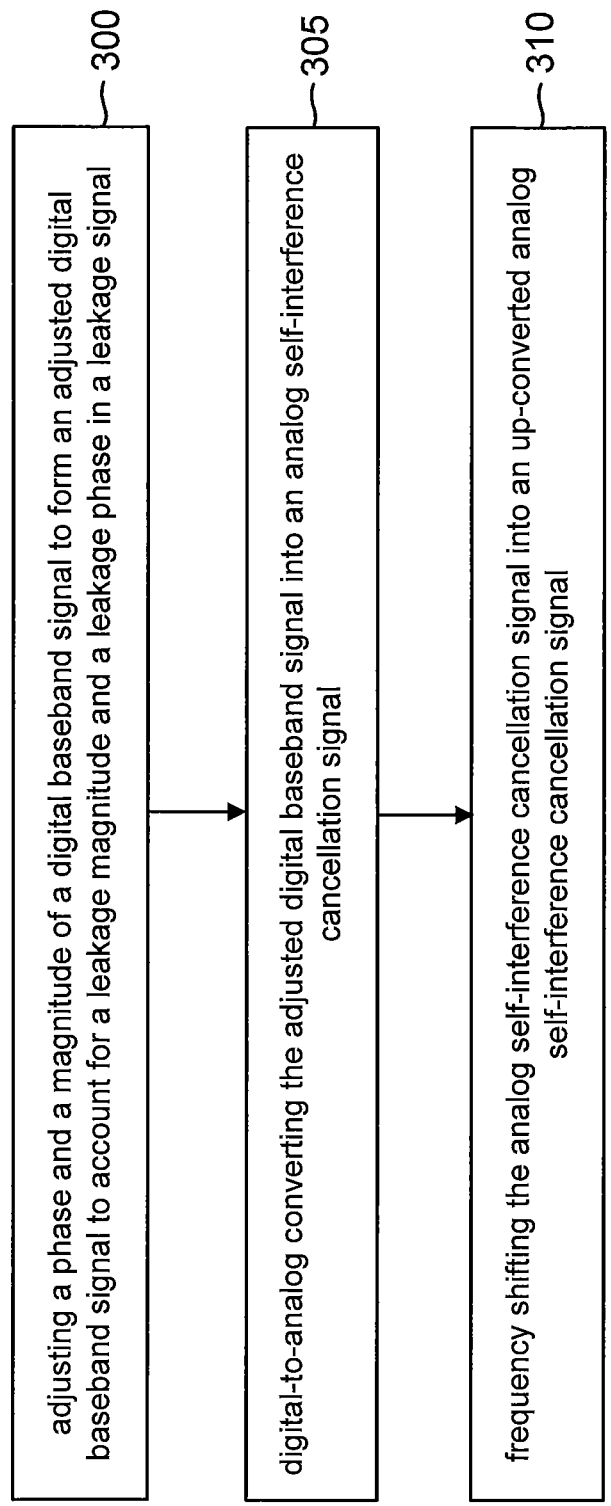
FIG. 3 is a flowchart of a method of cancelling self-interference for an in-band full-duplex system.

A method of reducing self-interference will now be discussed for the flowchart of FIG. 3. The method includes an act 300 of adjusting a phase and a magnitude of a digital baseband signal to form an adjusted digital baseband signal to account for a leakage magnitude and a leakage phase in a self-interference leakage signal. The baseband signal adjustment in the self-interference correction paths of baseband section 105 or in equalizer 230 of baseband section 205 are examples of act 300. The method also includes an act 305 of digital-to-analog converting the adjusted digital baseband signal into an analog self-interference cancellation signal. The formation of the analog self-interference cancellation I and Q signals in baseband section 105 or baseband section 205 is an example of act 305. The method further includes an act 310 of frequency shifting the analog self-interference cancellation signal into an up-converted analog self-interference cancellation signal. The up-conversion of the analog self-interference cancellation I and Q signals in IF section 110 is an example of act 310. Finally, the method includes an act 315 of adding the up-converted analog self-interference cancellation signal with a received signal to form a self-interference-cancelled signal in which the leakage signal is substantially cancelled. The formation of self-interference-cancelled signal 157 in IF section 110 is an example of act 315. Note that the method is generic to what frequency the SI cancellation occurs such that it may be performed in the IF in a superheterodyne embodiment or in the RF in a direct-conversion embodiment.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

We claim:

1. An in-band full-duplex transceiver with self-interference cancellation, comprising:
a self-interference correction circuit configured to vary a phase and a magnitude of a digital baseband signal to form an adjusted digital baseband signal;
a digital-to-analog converter (DAC) configured to convert the adjusted digital baseband signal into an analog self-interference cancellation signal, wherein the analog self-interference cancellation signal comprises an analog self-interference cancellation in-phase signal and an analog self-interference cancellation quadrature-phase signal;
a mixer configured to up-convert the analog self-interference cancellation signal in frequency into an up-converted analog self-interference cancellation signal, wherein the mixer comprises
an in-phase self-interference mixer configured to up-convert the analog self-interference cancellation in-phase signal responsive to a local oscillator clock signal to form an up-converted analog self-interference cancellation in-phase signal, and
a quadrature-phase self-interference mixer configured to up-convert the analog self-interference cancellation quadrature-phase signal responsive to a quadrature of the local oscillator clock signal to form an up-converted analog self-interference cancellation quadrature-phase signal, the up-converted analog self-interference cancellation signal comprising a sum of the up-converted analog self-interference cancellation in-phase signal and the up-converted analog self-interference cancellation quadrature-phase signal; and
a self-interference cancellation adder configured to add the up-converted analog self-interference cancellation signal with a received analog signal to form a self-interference-cancelled signal.

2. The in-band full-duplex transceiver of claim 1, wherein the in-band full-duplex transceiver comprises a superheterodyne transceiver.

3. The in-band full-duplex transceiver of claim 1, wherein the digital baseband signal comprises a digital baseband in-phase signal and digital baseband quadrature-phase signal, and wherein the self-interference correction circuit comprises:
a plurality of in-phase self-interference correction circuits each configured to adjust a phase and a magnitude of the digital baseband in-phase signal; and
a plurality of quadrature-phase self-interference correction circuits each configured to adjust a phase and a magnitude of the digital baseband quadrature-phase signal.

4. The in-band full-duplex transceiver of claim 3, further comprising:
a first adder to add an output signal from each in-phase self-interference correction circuit to form an adjusted digital baseband in-phase signal; and
a second adder to add an output signal from each quadrature-phase self-interference correction circuit to form an adjusted digital baseband quadrature-phase signal, and wherein the DAC comprises:
a first DAC configured to convert the adjusted digital baseband in-phase signal into the analog self-interference cancellation in-phase signal; and
a second DAC configured to convert the adjusted quadrature-phase digital baseband signal into the analog self-interference cancellation quadrature-phase signal.

5. The in-band full-duplex transceiver of claim 3, further comprising:
a radio-frequency mixer configured to down-convert a received radio-frequency signal to form the received analog signal, and wherein the received analog signal is a received intermediate-frequency signal.

6. The in-band full-duplex transceiver of claim 1, wherein the self-interference correction circuit is configured to vary the phase and the magnitude of the digital baseband signal to form the adjusted digital baseband signal to account for a corresponding phase and a magnitude of a self-interference leakage path in the in-band-full-duplex transceiver.

7. The in-band full-duplex transceiver of claim 6, wherein the self-interference leakage path comprises an over-the-air direct leakage path, a leakage path including a scatterer external to the in-band full-duplex transceiver; and an on-chip direct leakage path.

8. The in-band full-duplex transceiver of claim 1, wherein the self-interference correction circuit comprises an equalizer.

9. The in-band full-duplex transceiver of claim 1, further comprising:
a distortion circuit configured to distort the adjusted digital baseband signal responsive to non-linearities in a transmit path and in a receive path.

10. A method of reducing a self-interference in an in-band full-duplex transceiver, comprising:
adjusting a phase and a magnitude of a digital baseband signal to form an adjusted digital baseband signal to account for a leakage magnitude and a leakage phase in a leakage signal;
digital-to-analog converting the adjusted digital baseband signal into an analog self-interference cancellation signal;
frequency shifting the analog self-interference cancellation signal into an up-converted analog self-interference cancellation signal; and
adding the up-converted analog self-interference cancellation signal with a received signal to form a self-interference-cancelled received analog signal in which the leakage signal is substantially cancelled,
wherein the analog self-interference cancellation signal comprises an analog self-interference cancellation in-phase signal and an analog self-interference cancellation quadrature-phase signal, and wherein frequency shifting the analog self-interference cancellation signal comprises:
frequency shifting the analog self-interference cancellation in-phase signal into an up-converted analog self-interference cancellation in-phase signal;
frequency shifting the analog self-interference cancellation quadrature-phase signal into an up-converted analog self-interference cancellation quadrature-phase signal; and
adding the up-converted analog self-interference cancellation in-phase signal and the up-converted analog self-interference cancellation quadrature-phase signal to form the up-converted analog self-interference cancellation signal.

11. The method of claim 10, wherein the adjusting the phase and the magnitude of the digital baseband signal comprises adjusting the digital baseband signal in an equalizer.

12. The method of claim 10, further comprising adjusting a delay for the digital baseband signal to further reduce the self-interference in the in-band full-duplex transceiver.

13. The method of claim 10, wherein the leakage signal is a leakage signal from an over-the-air direct leakage path for the in-band full-duplex transceiver.

14. The method of claim 10, wherein the leakage signal is a leakage signal from a leakage path that includes an external scatterer to the in-band full-duplex transceiver.

15. The method of claim 10, wherein the leakage signal is a leakage signal from an on-chip leakage path in the in-band full-duplex transceiver.

16. An in-band full-duplex transceiver having a self-interference leakage path, comprising:
means for adjusting a phase and a magnitude of a digital baseband signal to form an adjusted digital baseband signal;
a digital-to-analog converter (DAC) configured to convert the adjusted digital baseband signal into an analog self-interference cancellation signal, wherein the analog self-interference cancellation signal comprises an analog self-interference cancellation in-phase signal and an analog self-interference cancellation quadrature-phase signal;
a first mixer configured to up-convert the analog self-interference cancellation signal in frequency into an up-converted analog self-interference cancellation signal, wherein the first mixer comprises
an in-phase self-interference mixer configured to up-convert the analog self-interference cancellation in-phase signal responsive to a local oscillator clock signal to form an up-converted analog self-interference cancellation in-phase signal, and
a quadrature-phase self-interference mixer configured to up-convert the analog self-interference cancellation quadrature-phase signal responsive to a quadrature of the local oscillator clock signal to form an up-converted analog self-interference cancellation quadrature-phase signal, the up-converted analog self-interference cancellation signal comprising a sum of the up-converted analog self-interference cancellation in-phase signal and the up-converted analog self-interference cancellation quadrature-phase signal; and
a self-interference cancellation adder configured to add the up-converted analog self-interference cancellation signal with a received analog signal to form a self-interference-cancelled signal.

17. The in-band full-duplex transceiver of claim 16, further comprising:
a second mixer configured to down-convert the self-interference-cancelled signal into a baseband signal.

18. The in-band full-duplex transceiver of claim 16, wherein the means comprises an equalizer.

19. The in-band full-duplex transceiver of claim 16, wherein the DAC comprises an in-phase DAC and a quadrature-phase DAC.

20. The in-band full-duplex transceiver of claim 19, wherein the self-interference correction circuit comprises a plurality of in-phase self-interference correction circuits and a plurality of quadrature-phase self-interference correction circuits, wherein the adjusted digital baseband signal comprises an adjusted digital baseband in-phase signal and an adjusted digital baseband quadrature-phase signal, the adjusted digital baseband in-phase signal comprising a summation of outputs of the plurality of in-phase self-interference correction circuits, the adjusted digital baseband quadrature-phase signal comprising a summation of outputs of the plurality of quadrature-phase self-interference correction circuits, wherein the in-phase DAC is configured to convert the adjusted digital baseband in-phase signal into the analog self-interference cancellation in-phase signal, and wherein the quadrature-phase DAC is configured to convert the adjusted digital baseband quadrature-phase signal into the analog self-interference cancellation quadrature-phase signal.

\* \* \* \* \*